(12) United States Patent
Wu et al.

(10) Patent No.: US 11,990,841 B2
(45) Date of Patent: May 21, 2024

(54) MULTI-MODE HYBRID CONTROL DC-DC CONVERTING CIRCUIT AND CONTROL METHOD THEREOF

(71) Applicant: MINMAX TECHNOLOGY CO., LTD., Tainan (TW)

(72) Inventors: Cheng-Chou Wu, Tainan (TW); Chun-Tse Chen, Tainan (TW)

(73) Assignee: MINMAX TECHNOLOGY CO., LTD., Tainan (TW)

( * ) Notice: Subject to any disclaimer, the term of this patent is extended or adjusted under 35 U.S.C. 154(b) by 115 days.

(21) Appl. No.: 17/689,560

(22) Filed: Mar. 8, 2022

(65) Prior Publication Data
US 2023/0291317 A1    Sep. 14, 2023

(51) Int. Cl.
*H02M 3/335* (2006.01)
*H02M 1/084* (2006.01)
*H02M 1/34* (2007.01)

(52) U.S. Cl.
CPC ....... *H02M 3/33553* (2013.01); *H02M 1/084* (2013.01); *H02M 1/34* (2013.01); *H02M 3/33523* (2013.01)

(58) Field of Classification Search
CPC ............ H02M 3/22; H02M 3/24; H02M 3/28; H02M 3/315; H02M 3/3155; H02M 3/335;

(Continued)

(56) References Cited

U.S. PATENT DOCUMENTS

| 7,764,515 B2 | 7/2010 | Jansen et al. |
| 10,811,978 B1 | 10/2020 | Zheng et al. |

(Continued)

FOREIGN PATENT DOCUMENTS

| CN | 101572490 A | 11/2009 |
| CN | 102170232 A * | 8/2011 |

(Continued)

OTHER PUBLICATIONS

English translation of CN102170232A. (Year: 2011).*
English translation of CN107196517A. (Year: 2017).*

*Primary Examiner* — Thienvu V Tran
*Assistant Examiner* — Carlos O Rivera-Perez
(74) *Attorney, Agent, or Firm* — Birch, Stewart, Kolasch & Birch, LLP

(57) ABSTRACT

A multi-mode hybrid control DC-DC converting circuit has a switching power converter and a microcontroller. The switching power converter has a transformer and a switching switch. The switching switch is connected to a primary-side winding of the transformer in series. The microcontroller is connected to the switching power converter and a control terminal of the switching switch. The microcontroller sets multiple thresholds according to an input voltage of the switching power converter, and determines whether a feedback voltage of the switching power converter is higher or lower than each one of the thresholds to perform a variable-frequency mode, a constant-frequency mode, or a pulse-skipping mode. The microcontroller outputs a driving signal to the switching switch and correspondingly adjusts a frequency of the driving signal according to the variable-frequency mode, the constant-frequency mode, or the pulse-skipping mode which is performed.

17 Claims, 7 Drawing Sheets

(58) Field of Classification Search
CPC ......... H02M 3/33507; H02M 3/33515; H02M 3/33523; H02M 3/3353; H02M 3/33538; H02M 3/33546; H02M 3/33553; H02M 1/0016; H02M 1/0019; H02M 1/0022; H02M 1/0025; H02M 1/0032; H02M 1/0035; H02M 1/084; H02M 1/32; H02M 1/34–348
USPC ..... 363/15–21.18, 40, 41, 50, 56.12, 74, 89; 323/271–276, 281–287, 299–303, 351
See application file for complete search history.

(56) References Cited

U.S. PATENT DOCUMENTS

| | | | |
|---|---|---|---|
| 2005/0184525 A1 | 8/2005 | Hisamoto | |
| 2005/0248965 A1* | 11/2005 | Yamada | H02M 3/33523 363/21.08 |
| 2013/0033902 A1 | 2/2013 | Zhang | |
| 2013/0294118 A1 | 11/2013 | So et al. | |

FOREIGN PATENT DOCUMENTS

| | | | | |
|---|---|---|---|---|
| CN | 104300795 A | | 1/2015 | |
| CN | 104485823 A | | 4/2015 | |
| CN | 107196517 A | * | 9/2017 | ........ H02M 3/33523 |
| CN | 107196517 B | | 7/2019 | |
| TW | 521481 B | | 2/2003 | |
| TW | 200743295 A | | 11/2007 | |
| TW | 202037054 A | | 10/2020 | |
| WO | WO 2009/128728 A2 | | 10/2009 | |

\* cited by examiner

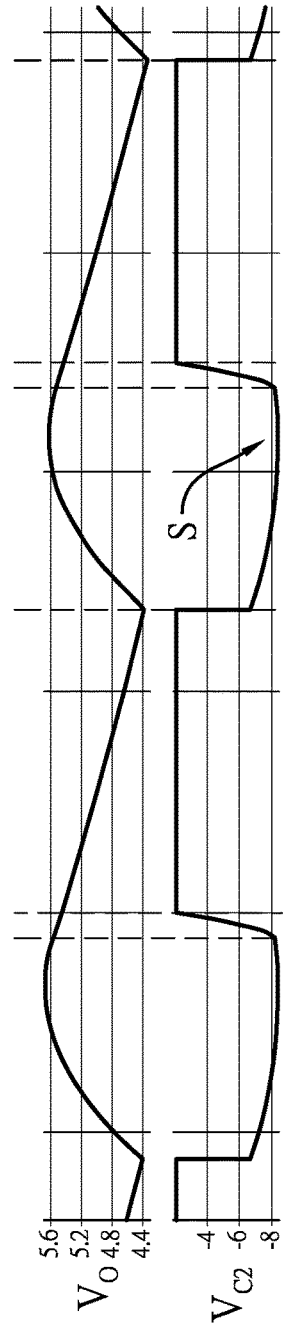
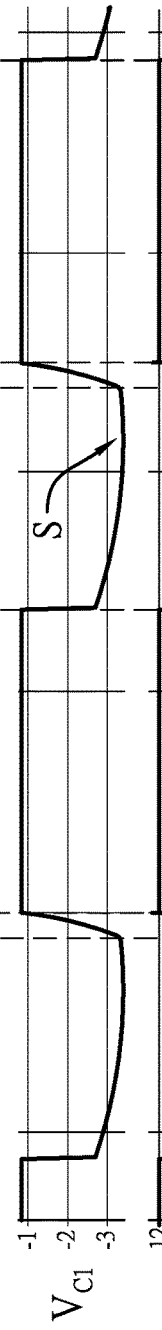
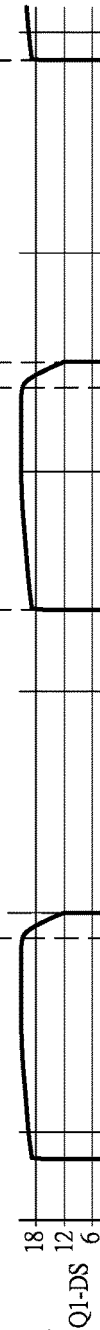
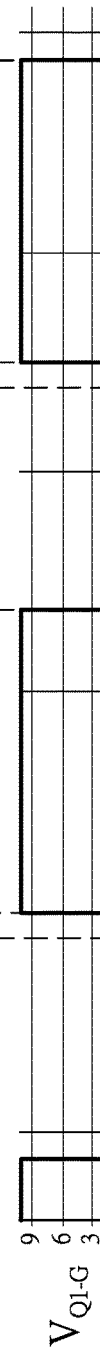
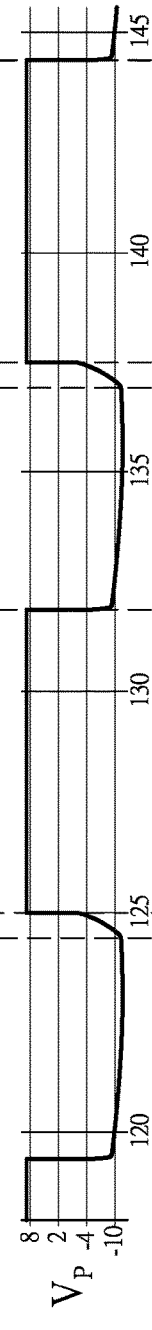
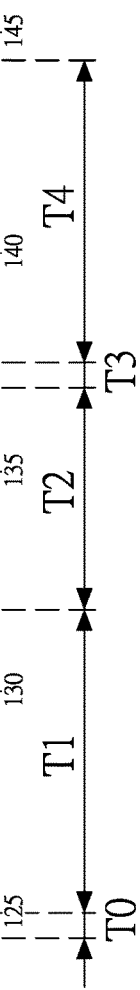

MULTI-MODE HYBRID CONTROL DC-DC CONVERTING CIRCUIT AND CONTROL METHOD THEREOF

BACKGROUND OF THE INVENTION

1. Field of the Invention

The present application relates generally to a circuit of a DC-DC converting circuit, and more particularly to a multi-mode hybrid control DC-DC converting circuit and control method thereof.

2. Description of Related Art

A conventional DC-DC (Direct Current-Direct Current) converting circuit has a switching power converter and a microcontroller. Flyback power converter can be an example of the switching power converter. The power output terminal of the flyback power converter is applied to be connected to a load. Basically, the flyback power converter has a transformer having a primary-side winding connected to a transistor in series. The transistor is a metal-oxide-semiconductor field-effect transistor (MOSFET) commonly. The microcontroller and its control loop are connected to power input terminals and power output terminals of the switching power converter and the gate of the transistor.

The microcontroller can detect an input voltage and a feedback voltage of the switching power converter to determine a loading of a load connected to the switching power converter. The microcontroller generates a driving (PWM) signal and outputs the driving signal to the transistor. The transistor will be turned on and off according to the driving signal.

In general, the microcontroller performs a quasi-resonant mode (QR mode). The QR mode has the function that when the detected loading is lower, the frequency of the driving signal is changed to be higher. However, the statuses of the loading are various, such as heavy loading, light loading, and so on. For example, the frequency of the driving signal can be 120 kHz for a full loading. When the loading decreases to be the light loading, such as 30% of the full loading, the frequency of the driving signal will rise to 400 kHz. Therefore, when the loading is light or even lighter and zero, the driving signal is still retained at higher frequencies, such that a switch in the switching power converter is switched (turned on and off) under higher frequencies. That will cause several problems, such as high frequency noise, high frequency switching loss, and electromagnetic interference to wires on circuit boards.

SUMMARY OF THE INVENTION

An objective of the present invention is to provide a multi-mode hybrid control DC-DC converting circuit and control method thereof, to mitigate the problems of the conventional DC-DC converting circuit under the QR mode for the light or lighter loading, wherein the problems include the high frequency noise, the high frequency switching loss, and the electromagnetic interference to the wires on the circuit boards.

The multi-mode hybrid control DC-DC converting circuit of the present invention comprises a switching power converter and a microcontroller. The switching power converter comprises a transformer and a switching switch. The switching switch is connected to a primary-side winding of the transformer in series and has a control terminal. The microcontroller is connected to the switching power converter and the control terminal of the switching switch. The microcontroller sets multiple thresholds according to an input voltage of the switching power converter, determines whether a feedback voltage of the switching power converter is higher or lower than each one of the thresholds to perform a variable-frequency mode, a constant-frequency mode, or a pulse-skipping mode. The microcontroller outputs a driving signal to the switching switch and correspondingly adjusts a frequency of the driving signal according to the variable-frequency mode, the constant-frequency mode, or the pulse-skipping mode which is performed.

The control method of a multi-mode hybrid control DC-DC converting circuit of the present invention is performed by a microcontroller connected to a switching power converter and a switching switch. The control method comprises:

step (a) detecting an input voltage and a feedback voltage of the switching power converter;
step (b) setting multiple thresholds according to the input voltage of the switching power converter;
step (c) determining whether the feedback voltage of the switching power converter is higher or lower than each one of the thresholds; and
step (d) performing a variable-frequency mode, a constant-frequency mode, or a pulse-skipping mode according to a determination result of the step (c), wherein the microcontroller outputs a driving signal to the switching switch and correspondingly adjusts a frequency of the driving signal according to the variable-frequency mode, the constant-frequency mode, or the pulse-skipping mode which is performed.

In the present invention, the term "multi-mode" includes the variable-frequency mode, the constant-frequency mode, and the pulse-skipping mode. The microcontroller monitors the input voltage and the feedback voltage of the switching power converter in real time. The feedback voltage of the switching power converter can reflect the loading of the load connected to the DC-DC converting circuit of the present invention. The thresholds set by the microcontroller are as references for assessing the loading of the load.

When the microcontroller determines the loading is heavy, the microcontroller performs the variable-frequency mode. When the microcontroller determines the loading is light or even lighter, the microcontroller performs the constant-frequency mode or the pulse-skipping mode. Under the constant-frequency mode or the pulse-skipping mode, the frequency of the driving signal is retained at a constant frequency and does not rise with the loading, even when the loading becomes lighter. By doing so, the problems as mentioned in the prior art, including the high frequency noise, the switching loss, and the electromagnetic interference to the wires on the circuit boards, caused by the light or lighter loading are efficiently mitigated. The switching power converter will have an optimized efficiency curve for the loading change from light to heavy.

BRIEF DESCRIPTION OF THE DRAWINGS

FIG. 5A is a detailed waveform diagram of the output voltage $V_O$ of the switching power converter in the present invention;

FIG. 5B is a waveform diagram of the voltage $V_{C2}$ between two terminals of the second capacitor (C2) as shown in FIG. 2;

FIG. 5C is a waveform diagram of the voltage $V_{C1}$ between two terminals of the first capacitor (C1) as shown in FIG. 2;

FIG. 5D is a waveform diagram of the drain-source voltage $V_{Q2\text{-}DS}$ of the clamp switch (Q2) as shown in FIG. 2;

FIG. 5E is a waveform diagram of the voltage $V_{Q2\text{-}G}$ between the gate and the source of the clamp switch (Q2) as shown in FIG. 2;

FIG. 5F is a waveform diagram of the drain-source voltage $V_{Q1\text{-}DS}$ of the switching switch (Q1) as shown in FIG. 2;

FIG. 5G is a waveform diagram of the gate voltage $V_{Q1\text{-}G}$ of the switching switch (Q1) as shown in FIG. 2;

FIG. 5H is a waveform diagram of the voltage VP between two terminals of the primary-side winding of the transformer as shown in FIG. 1;

FIG. 6 is a circuit diagram of the operation that the switching switch (Q1) is turned off and the clamp switch (Q2) is turned on.

DETAILED DESCRIPTION OF PREFERRED EMBODIMENT(S)

The multi-mode hybrid control DC-DC (Direct Current-Direct Current) converting circuit of the present invention comprises a switching power converter and a microcontroller (MCU), or may further comprise an active clamp circuit. Flyback power converter can be an example of the switching power converter. Working principle of the flyback power converter is not the focus in the present invention, so is introduced merely briefly as follows.

Figure 1:
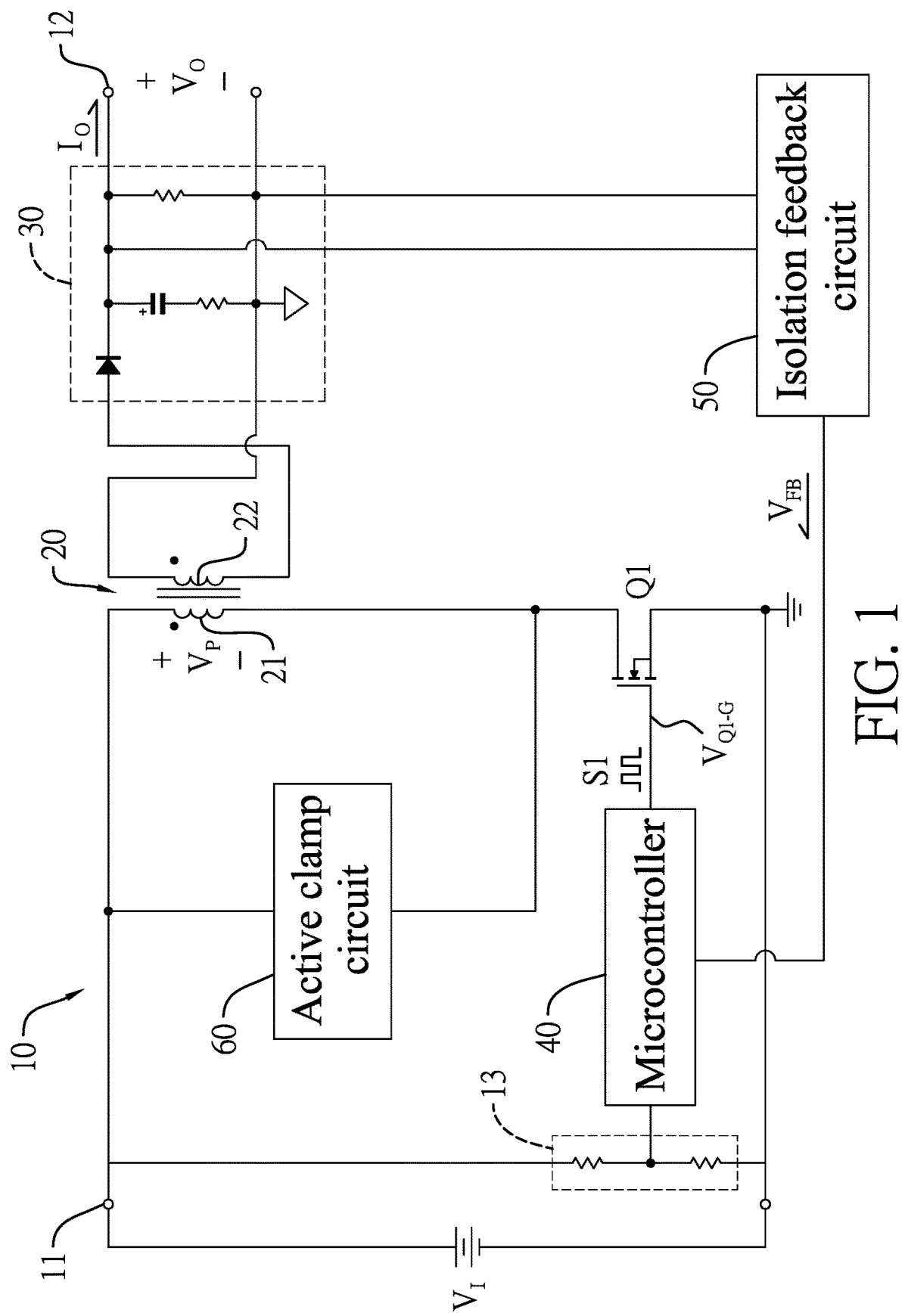
FIG. 1 is a circuit diagram of an embodiment of the DC-DC converting circuit of the present invention.

With reference to FIG. 1, the switching power converter 10 comprises a transformer 20, a switching switch Q1, and an output circuit 30. A primary-side winding 21 and a secondary-side winding 22 of the transformer 20 are not connected to a same ground. A first terminal of the primary-side winding 21 is connected to a power input terminal 11 of the switching power converter 10 to receive an input voltage $V_I$. The switching switch Q1 is connected to the primary-side winding 21 and has a control terminal. In an embodiment of the present invention, the switching switch Q1 may be a transistor, such as a metal-oxide-semiconductor field-effect transistor (MOSFET), having a gate as the control terminal, a drain connected to a second terminal of the primary-side winding 21, and a source being grounded. The switching switch Q1 and the primary-side winding 21 form a series connection based on the above-mentioned configuration. The output circuit 30 is connected to the secondary-side winding 22 and has power output terminals 12 to be connected to a load. The output circuit 30 provides an output voltage $V_O$ to the load via the power output terminals 12. A signal input terminal of the microcontroller 40 is connected to the switching power converter 10. A signal output terminal of the microcontroller 40 is connected to the control terminal of the switching switch Q1. The microcontroller 40 can output a driving signal S1 to the switching switch Q1 to turn on and off the switching switch Q1. The driving signal S1 may be a pulse-width-modulation (PWM) signal. The microcontroller 40 can arrange and adjust the pulse width and the frequency of the driving signal S1.

In an embodiment of the present invention, a first signal input terminal of the microcontroller 40 is connected to the power output terminals 12 of the switching power converter 10 via an isolation feedback circuit 50, such that the microcontroller 40 can receive a feedback voltage $V_{FB}$ from the isolation feedback circuit 50. The feedback voltage $V_{FB}$ may reflect the output voltage $V_O$ of the switching power converter 10. Namely, when the switching power converter 10 is connected to a load, the magnitude of the feedback voltage $V_{FB}$ may reflect the loading provided by the load, wherein the loading may be full loading, heavy loading, light loading, super light loading, and no loading. It is to be noted that to obtain the feedback voltage $V_{FB}$ from the isolation feedback circuit 50 to detect the loading is the ordinary art in the field of power circuit technique. Working principle of the isolation feedback circuit 50 is not the focus in the present invention, so is introduced merely briefly as follows. The circuit diagram of the isolation feedback circuit 50 may refer to FIG. 2. The isolation feedback circuit 50 basically comprises a photocoupler 51. The photocoupler 51 has two input terminals, a first output terminal, and a second output terminal. The two input terminals of the photocoupler 51 are respectively connected to the power output terminals 12 of the switching power converter 10. The first output terminal of the photocoupler 51 is connected to a voltage source Vcc and the first signal input terminal of the microcontroller 40, such that the microcontroller 40 can receive the feedback voltage $V_{FB}$ from the isolation feedback circuit 50. The second output terminal of the photocoupler 51 is grounded. The voltage source Vcc may be obtained from the primary-side winding 21. For example, an auxiliary winding (not shown in the figures) may be coupled to the primary-side winding 21, or a voltage divider (not shown in the figures) may be connected to the primary-side winding 21. The photocoupler 51 is connected to the auxiliary winding or the voltage divider to obtain the voltage source Vcc.

The microcontroller 40 stores multiple thresholds that are adjustable preset values. The thresholds are as references for assessing the loading of the load. The microcontroller 40 determines relative relationships of the feedback voltage $V_{FB}$ and the thresholds, and then performs one of multiple control modes according to its determination result. The microcontroller 40 correspondingly adjusts the pulse width and/or the frequency of the driving signal S1 outputted to the switching switch Q1 according to the control mode that is performed.

In an embodiment of the present invention, the control modes comprises a variable-frequency mode, a constant-frequency mode, and a pulse-skipping mode (PSM). When the loading is the full loading or the heavy loading, the microcontroller 40 performs the variable-frequency mode. As the term "variable-frequency" implies, the microcontroller 40 changes the frequency of the driving signal S1 with the loading. In general, the loading and the frequency of the driving signal S1 have a mutual relationship. When the loading becomes lower, the frequency of the driving signal S1 is changed to be higher. In contrast, when the loading becomes higher, the frequency of the driving signal S1 is changed to be lower. The above-mentioned mutual relationship is the ordinary art in the field of power circuit technique. For example, the variable-frequency mode can be a quasi-resonant mode (QR mode). When the loading is the light loading, the microcontroller 40 performs the constant-frequency mode. As the term "constant-frequency" implies, the microcontroller 40 keeps the frequency of the driving signal S1 constant. When the loading is the super light loading or no loading, the microcontroller 40 performs the pulse-skipping mode, such that the frequency of the driving signal S1 is changed alternately between zero and non-zero. The frequency of "non-zero" is the constant frequency in the constant-frequency mode. That will be described as follows. In the variable-frequency mode, the frequency of the driving signal S1 is defined as a full-load frequency while the loading is the full loading. For example, the full-load frequency may be 120 kHz. In the constant-frequency mode and the pulse-skipping mode, the frequency of the driving signal S1 is equal to or higher than a half of the full-load frequency.

A second signal input terminal of the microcontroller 40 can detect the input voltage $V_I$ of the switching power converter 10. As shown in FIG. 1 as an example, the second signal input terminal of the microcontroller 40 may be connected to the power input terminals 11 of the switching power converter 10 via a voltage divider 13 to detect the input voltage $V_I$. The microcontroller 40 sets the thresholds according to the input voltage $V_I$ of the switching power converter 10. In an embodiment of the present invention, the thresholds include a first threshold $V_{LL}$ and a second threshold $V_{SK}$, wherein $V_{LL} > V_{SK}$. In other words, the second threshold $V_{SK}$ is lower than the first threshold $V_{LL}$. When the microcontroller 40 determines that the feedback voltage $V_{FB}$ is higher than the first threshold $V_{LL}$, the microcontroller 40 performs the variable-frequency mode to correspond to the loading as the full loading or the heavy loading. When the microcontroller 40 determines that the feedback voltage $V_{FB}$ is lower than or equal to the first threshold $V_{LL}$ and higher than the second threshold $V_{SK}$, the microcontroller 40 performs the constant-frequency mode to correspond to the loading as the light loading. When the microcontroller 40 determines that the feedback voltage $V_{FB}$ is lower than or equal to the second threshold $V_{SK}$, the microcontroller 40 performs the pulse-skipping mode to correspond to the loading as the super light loading or no loading.

Figure 3:
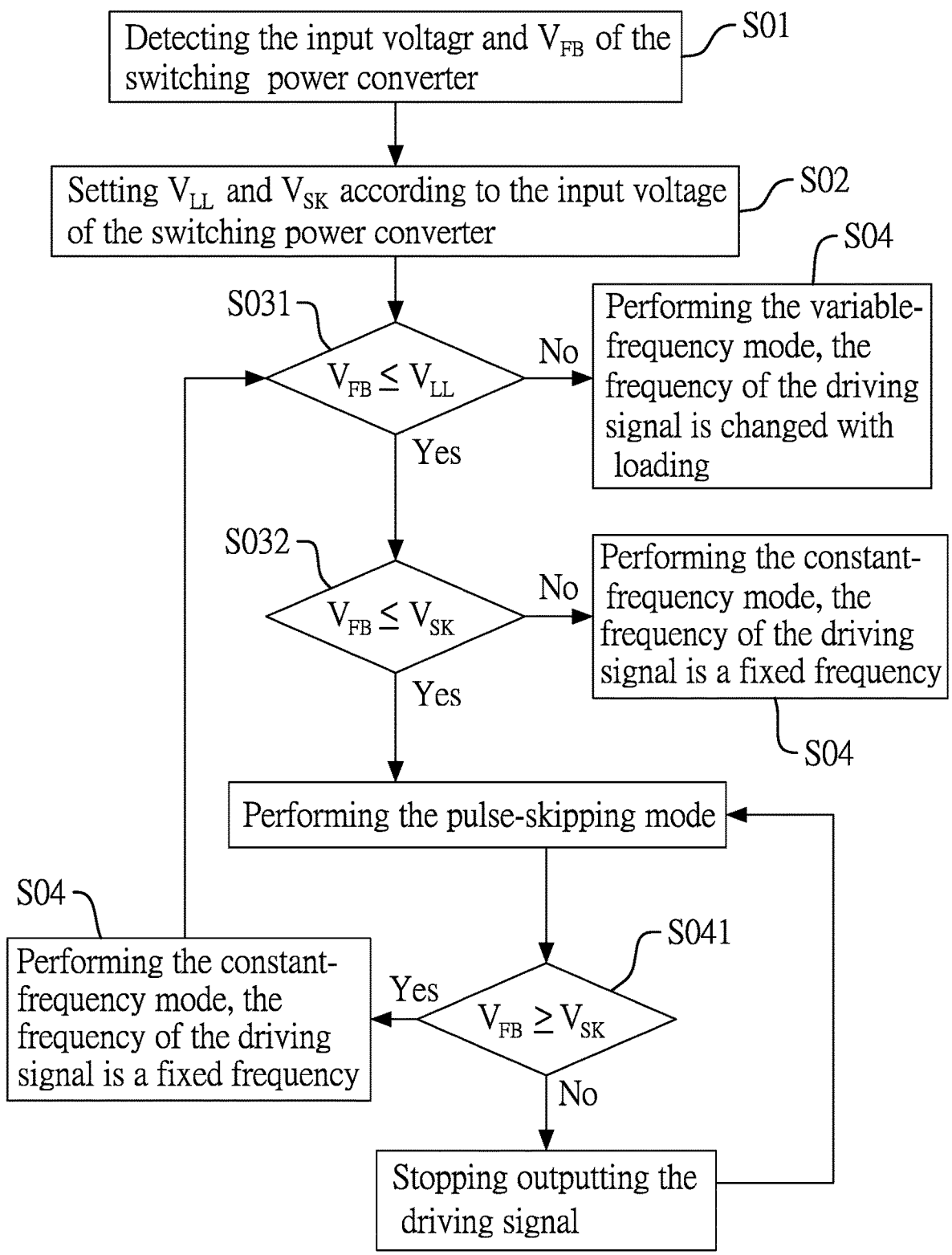
FIG. 3 is a flow chart of the control method of the present invention.

The circuit configuration and the function of the switching power converter 10 and the microcontroller 40 are described above. The multi-mode hybrid control method performed by the microcontroller 40 is described as follows with waveform diagrams. The flow chart of the control method refers to FIG. 3.

STEP S01: The microcontroller 40 detects the input voltage $V_I$ and the feedback voltage $V_{FB}$ of the switching power converter 10. As mentioned above, the microcontroller 40 can detect the input voltage $V_I$ of the switching power converter 10 via the voltage divider 13, and receive the feedback voltage $V_{FB}$ via the isolation feedback circuit 50. The feedback voltage $V_{FB}$ reflects the output voltage $V_O$ of the switching power converter 10. The output voltage $V_O$ reflects the loading of the load connected to the switching power converter 10. Hence, the feedback voltage $V_{FB}$ can be used to detect the loading of the load.

STEP S02: The microcontroller 40 sets the multiple thresholds according to the input voltage $V_I$ of the switching power converter 10. As mentioned above, the thresholds include the first threshold $V_{LL}$ and the second threshold $V_{SK}$. The first threshold $V_{LL}$ is higher than the second threshold $V_{SK}$. In an embodiment of the present invention, the microcontroller 40 can store multiple feedback reference values, a first ratio value R1, and a second ratio value R2. The feedback reference values respectively correspond to different magnitudes of the input voltage $V_I$ of the switching power converter 10. The first ratio value is higher than the second ratio value, such as R1>R2. For example, the first ratio value R1 can be 55%, and the second ratio value can be 10%. The microcontroller 40 selects one of the feedback reference values which corresponds to the input voltage $V_I$ of the switching power converter 10. Then, the microcontroller 40 multiplies the selected feedback reference value by the first ratio value R1 to obtain the first threshold $V_{LL}$, namely, $V_{LL}$=the selected feedback reference value×R1. Besides, the microcontroller 40 multiplies the selected feedback reference value by the second ratio value R2 to obtain the second threshold $V_{SK}$, namely, $V_{SK}$=the selected feedback reference value×R2. The following correspondence table recites an example for different magnitudes of the input voltage $V_I$ and the feedback reference values. When the microcontroller 40 detects that the input voltage $V_I$ of the switching power converter 10 is 9V, the microcontroller 40 selects 2.32V as the feedback reference value to compute the first threshold $V_{LL}$ and the second threshold $V_{SK}$. The selection for other feedback reference values can be deduced.

| Input voltage VI of the switching power converter | Feedback reference values |
|---|---|
| 9 V | 2.32 V |
| 24 V | 2.09 V |
| 36 V | 1.81 V |

In principle, the feedback reference value, the first ratio value R1, and the second ratio value R2 are designed for the purposes of better efficiency in the light loading and better power consumption in no loading, so as to determine a timing for the microcontroller 40 to enter the constant-frequency mode and the pulse-skipping mode. In an embodiment of the present invention, by setting the first ratio value R1, the constant-frequency mode will be performed while the loading of the load is equal to a half of the full loading, and the frequency of the driving signal S1 is equal to or higher than a half of the full-load frequency.

STEP S03: The microcontroller 40 determines the relative relationships of the feedback voltage $V_{FB}$ of the switching power converter 10 and the thresholds. Namely, the microcontroller 40 determines whether the feedback voltage $V_{FB}$ of the switching power converter 10 is higher or lower than each one of the thresholds. In an embodiment of the present invention, the microcontroller 40 determines the relative relationship between the feedback voltage $V_{FB}$ and the first threshold $V_{LL}$ at first, and then determines the relative relationship between the feedback voltage $V_{FB}$ and the second threshold $V_{SK}$. That will be described as follows.

Figure 4A:
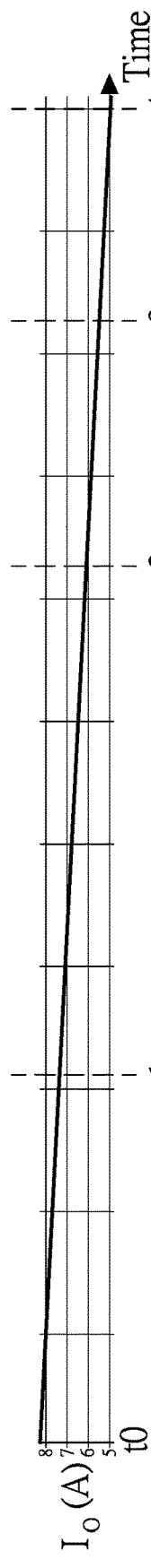
FIG. 4A is a waveform diagram of the output current $I_O$ of the switching power converter in the present invention.
Figure 4B:
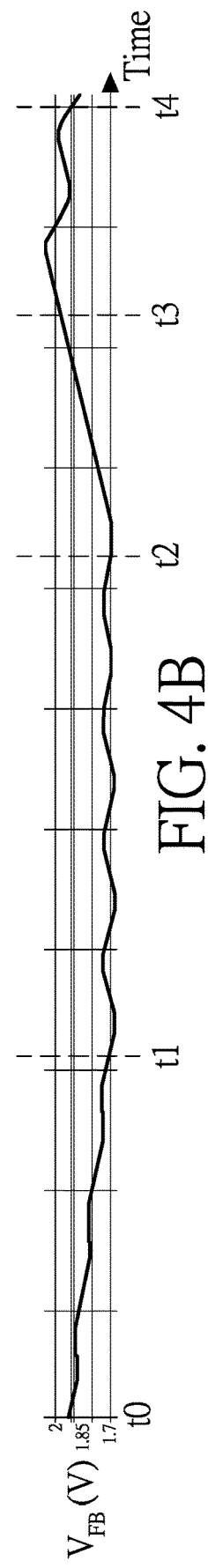
FIG. 4B is a waveform diagram of the feedback voltage $V_{FB}$ in the present invention.
Figure 4C:
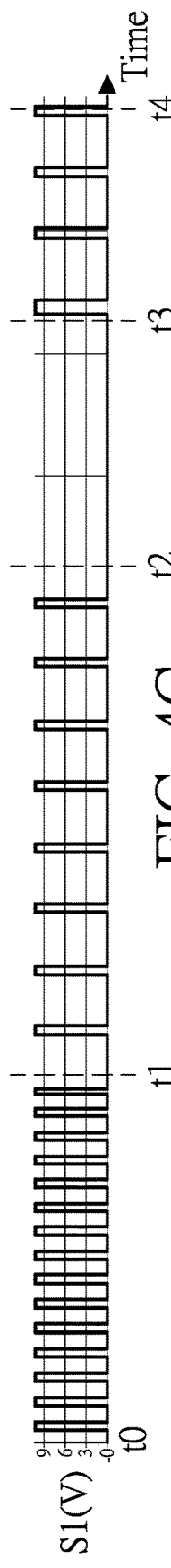
FIG. 4C is a waveform diagram of the driving signal S1 in the present invention.
Figure 4D:
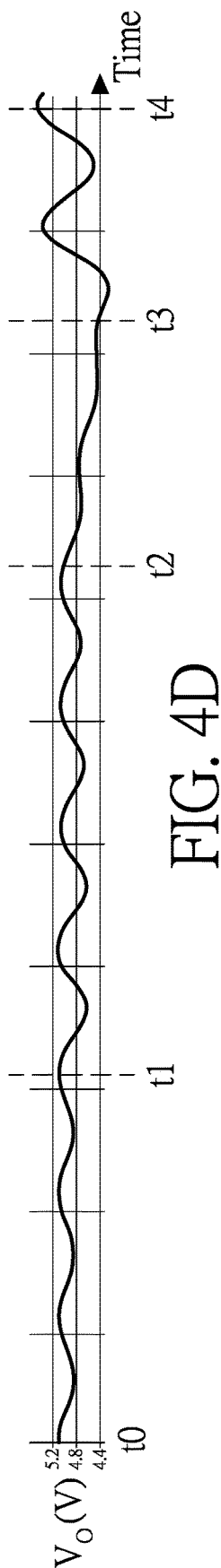
FIG. 4D is a waveform diagram of the output voltage $V_O$ of the switching power converter in the present invention.

STEP S04: The microcontroller 40 performs the variable-frequency mode, the constant-frequency mode, or the pulse-skipping mode according to a determination result of the STEP S03, wherein the microcontroller 40 outputs the driving signal S1 to the switching switch Q1 and correspondingly adjusts the voltage magnitude, the pulse width, and/or the frequency of the driving signal S1 according to the variable-frequency mode, the constant-frequency mode, or the pulse-skipping mode which is performed. The waveform diagrams of the output current $I_O$ and the output voltage $V_O$ of the switching power converter 10, the feedback voltage $V_{FB}$, and the driving signal S1 refer to FIGS. 4A-4D. FIG. 4A shows the waveform diagram of the output current $I_O$ of the switching power converter 10. The output current $I_O$ is maximum at t0 and decreases with time. Therefore, FIGS. 4A-4D represent the loading change of the full loading started from t0, the heavy loading, the light loading, the super light loading, and no loading in sequence.

In the STEP S03, the microcontroller 40 determines whether the feedback voltage $V_{FB}$ is lower than or equal to the first threshold $V_{LL}$ (STEP S031). If the determination in the STEP S031 is NO, the microcontroller 40 enters the STEP S04 to perform the variable-frequency mode to change the frequency of the driving signal S1 with the loading of the load. If the determination in the STEP S031 is YES, the microcontroller 40 determines whether the feedback voltage $V_{FB}$ is lower than or equal to the second threshold $V_{SK}$ (STEP S032). If the determination in the STEP S032 is NO, the microcontroller 40 enters the STEP S04 to perform the constant-frequency mode to keep the frequency of the driving signal S1 constant; namely, the frequency of the driving signal S1 is a fixed frequency.

If the determination in the STEP S032 is YES, the microcontroller 40 enters the STEP S04 to perform the pulse-skipping mode. In the pulse-skipping mode, the microcontroller 40 determines whether the feedback voltage $V_{FB}$ rises to be higher than or equal to the second threshold $V_{SK}$ (STEP S041). If the determination in the STEP S041 is YES, the microcontroller 40 performs the constant-frequency mode to keep the frequency of the driving signal S1 constant and then returns to the STEP S031. If the determination in STEP S041 is NO, the microcontroller 40 stops outputting the driving signal S1 to the switching switch Q1.

As shown in FIGS. 4A-4D, the microcontroller 40 determines $V_{FB} \leq V_{LL}$ at t1 and so enters the constant-frequency mode. Namely, the waveform diagrams from t0 to t1 represent the loading is the full loading or the heavy loading. Hence, the microcontroller 40 performs the variable-frequency mode in the phase from t0 to t1, such that the output current $I_O$ is higher and the output voltage $V_O$ is more stable then. Afterward, the microcontroller 40 determines $V_{FB} \leq V_{SK}$ at t2 and so enters the pulse-skipping mode. Namely, the waveform diagrams from t1 to t2 represent the loading is the light loading. Hence, after the microcontroller 40 enters the constant-frequency mode from the variable-frequency mode, the microcontroller 40 reduces the frequency of the driving signal S1. The phase from t2 to t4 represents that the loading is the super light loading or no loading, such that the microcontroller 40 performs the pulse-skipping mode from t2 to t4. The microcontroller 40 determines $V_{FB} \geq V_{SK}$ in the phase from t2 to t3, and so stops outputting the driving signal S1, namely, the voltage level and the frequency of the driving signal S1 are 0V and 0 Hz. Besides, the microcontroller 40 determines $V_{FB} \geq V_{SK}$ at t3, and so performs the constant-frequency mode. Therefore, the frequency of the driving signal S1 is changed alternately between zero and non-zero in the phase from t2 to t4.

The variation of the output voltage $V_O$ of the switching power converter 10 in the phase from t2 to t4 represents the phenomenon of the pulse-skipping mode. With reference to FIGS. 2 and 4A-4D, around t2, the driving signal S1 is 0V temporarily, the output voltage $V_O$ of the switching power converter 10 starts to decrease gradually, and the feedback voltage $V_{FB}$ received by the microcontroller 40 via the isolation feedback circuit 50 rises gradually based on voltage source Vcc connected to the first output terminal of the photocoupler 51. As time goes on, the microcontroller 40 determines $V_{FB} \geq V_{SK}$ at t3, and so performs the constant-frequency mode. Hence, in the phase from t3 to t4, the microcontroller 40 outputs the driving signal S1 under the constant-frequency mode to the switching switch Q1. Then, the output voltage $V_O$ of the switching power converter 10 starts to rise gradually, and the feedback voltage $V_{FB}$ received by the microcontroller 40 via the isolation feedback circuit 50 decreases gradually correspondingly. After t4, over and over again, it can be deduced that the microcontroller 40 may determine $V_{FB} \leq V_{SK}$, and so stop outputting the driving signal S1, such that the frequency of the driving signal S1 is changed alternately between zero and non-zero in the pulse-skipping mode.

Figure 2:
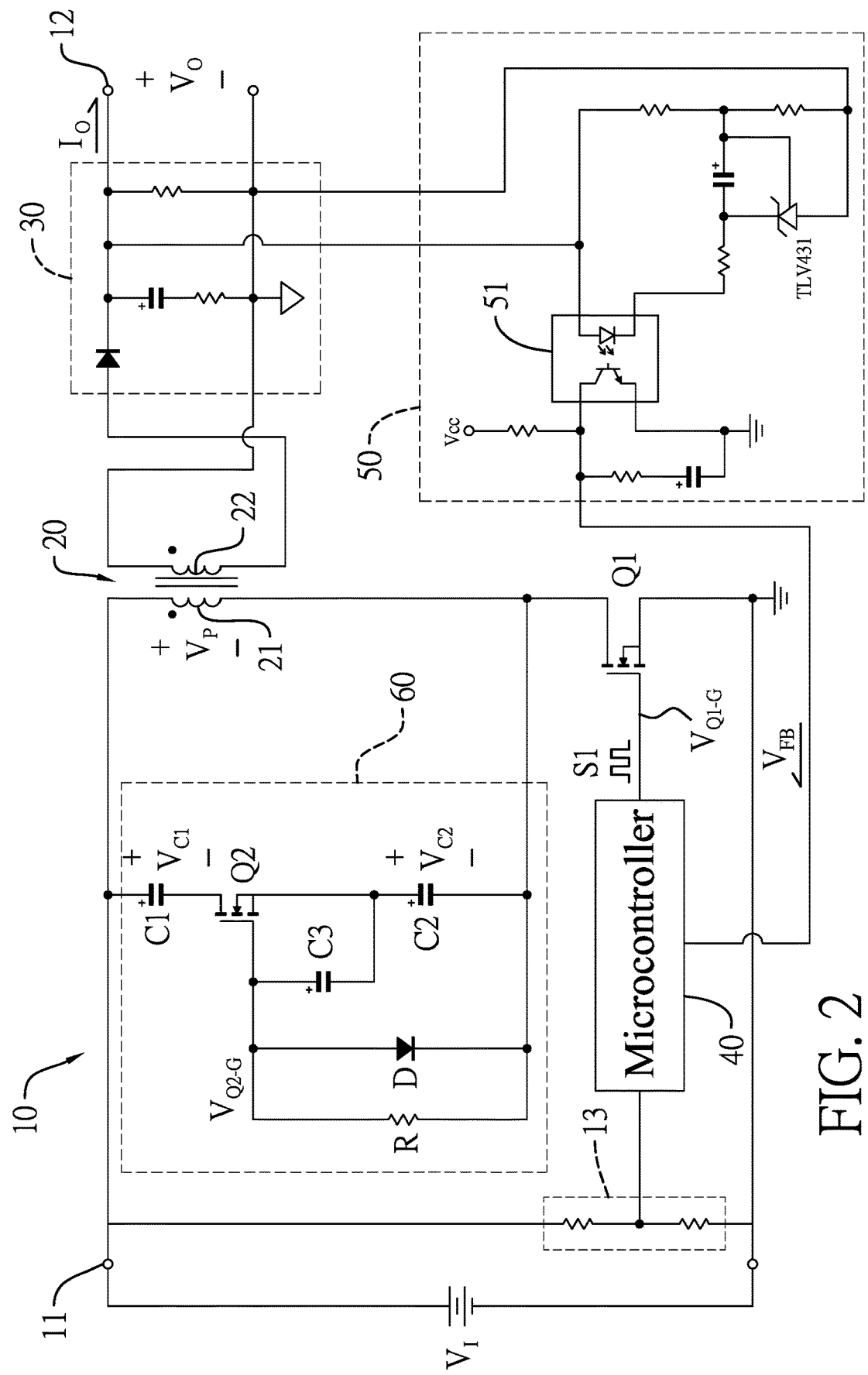
FIG. 2 is a detailed circuit diagram of an embodiment of the DC-DC converting circuit of the present invention.

With reference to FIG. 1 and FIG. 2, the active clamp circuit 60 in the present invention is connected to the primary-side winding 21 of the transformer 20. The active clamp circuit 60 can be a self-driven active clamp circuit and comprises a clamp switch Q2, a first capacitor C1, a second capacitor C2, and a resistor R. The active clamp circuit 60 may further comprise a diode D. For the circuit configuration of the flyback power converter, the clamp switch Q2 can be a high-side switch, and the switching switch Q2 can be a low-side switch.

A terminal of the clamp switch Q2 is connected to a terminal of the first capacitor C1. Another terminal of the first capacitor C1 is connected to the first terminal of the primary-side winding 21 of the transformer 20 and the power input terminal 11 of the switching power converter 10. Another terminal of the clamp switch Q2 is connected to a terminal of the second capacitor C2. Another terminal of the second capacitor C2 is connected to the second terminal of the primary-side winding 21 of the transformer 20 and a terminal of the switching switch Q1. Hence, the clamp switch Q2 is connected between the first capacitor C1 and a second capacitor C2 in series. In addition, the clamp switch Q2 has a control terminal. In an embodiment of the present invention, the clamp switch Q2 is a transistor, such as a MOSFET having a gate as the control terminal, a drain connected to the first capacitor C1, and a source connected to the second capacitor C2. A parasitic capacitance C3 exists between the gate and the source of the clamp switch Q2.

A terminal of the resistor R is connected to the control terminal of the clamp switch Q2. Another terminal of the resistor R is connected to the second terminal of the primary-side winding 21 of the transformer 20 and a terminal of the switching switch Q1. An anode of the diode D is connected to the control terminal of the clamp switch Q2. A cathode of the diode D is connected to the second terminal of the primary-side winding 21 of the transformer 20 and a terminal of the switching switch Q1. Namely, two terminals of the resistor R are respectively connected to the anode and the cathode of the diode D, such that the resistor R is connected across the diode D.

The active clamp circuit 60 is applied to a boundary current mode (BCM), and related voltage waveform diagrams refer to FIGS. 5A to 5H, wherein the vertical axis represents voltage value (V), and the horizontal axis represents the time. The circuit operation of the active clamp circuit 60 in the present invention is described as follows.

Time segment t0: Under the boundary current mode (BCM), the voltage VP on the primary-side winding 21 of the transformer 20 is gradually reduced to 0V. The voltage $V_{C2}$ on the second capacitor C2 is reduced to 0V, too. The parasitic capacitance C3 is discharged via the diode D, such that the voltage on the parasitic capacitance C3 is reduced to 0V rapidly. As a result, the gate voltage of the clamp switch Q2 will be lower than a turn-on threshold voltage (Vgs-th).

Then, the clamp switch Q2 is turned off. At that time, as the voltage reduction of the voltage $V_P$ on the primary-side winding 21, the drain-source voltage $V_{Q1-DS}$ of the switching switch Q1 is reduced to 0V from a prior high voltage level, and a signal of high is sent to the gate voltage $V_{Q1-G}$ of the switching switch Q1. Control mode of the switching switch Q1 reaches a zero voltage switching (ZVS).

Time segment t1: The switching switch Q1 is turned on. In other words, the switching switch Q1 changes to on-state from a prior off-state. The voltage $V_P$ of the primary-side winding 21 of the transformer 20 rises to $V_I$ from 0V.

Figure 6:
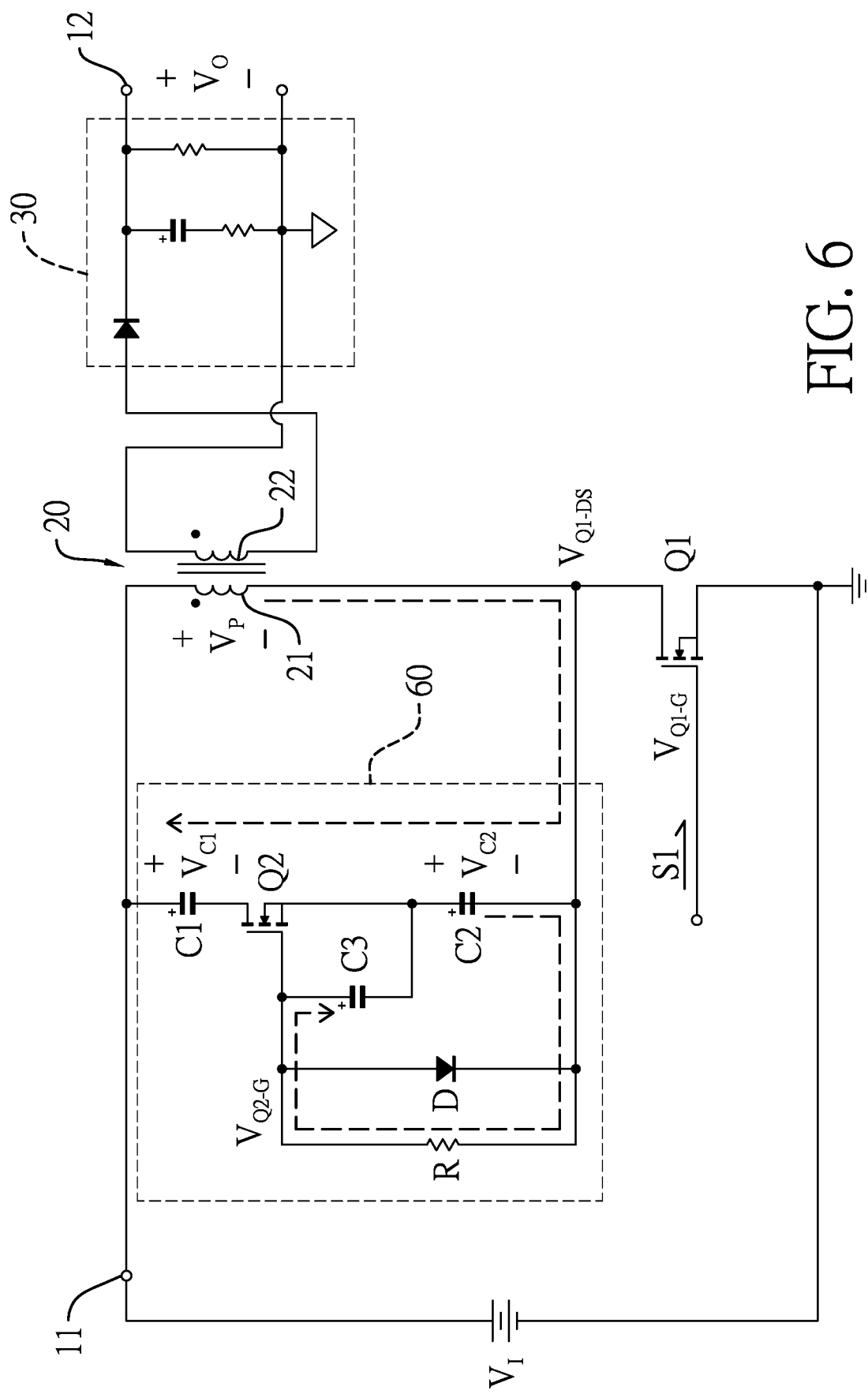

Time segment t2: When gate voltage $V_{Q1-G}$ of the switching switch Q1 is reduced to a low voltage level (such as the low level in the PWM signal), the switching switch Q1 changes to the off-state. Because the switching switch Q1 changes to off-state from a prior on-state, an inverse voltage is generated on the primary-side winding 21 of the transformer 20, so the voltage $V_P$ of the primary-side winding 21 shown in FIG. 5H is negative. With reference to FIG. 6, the voltage $V_P$ charges the second capacitor C2 and the first capacitor C1 via a body diode of the clamp switch Q2. Within the charging duration of the second capacitor C2 and the first capacitor C1, the second capacitor C2 and the first capacitor C1 also absorb the current spike induced by the leakage inductance of the transformer 20. Then, the second capacitor C2 and the first capacitor C1 will be gradually charged to reach a steady state. Since the body diode is turned on previously, the drain-source voltage $V_{Q2-DS}$ of the clamp switch Q2 is reduced to be lower than approximation of the forward voltage (VF) of the body diode before a driving signal is sent to the clamp switch Q2, as shown in the position "S" of FIGS. 5B and 5C. Within the charging duration of the second capacitor C2, as shown in FIG. 6, the second capacitor C2 may charge the parasitic capacitance C3 via the resistor R. When the voltage on the parasitic capacitance C3 reaches the turn-on threshold voltage (Vgs-th) of the clamp switch Q2, the clamp switch Q2 changes to on-state to implement the zero voltage switching (ZVS) and absorb the current spike. The resistor R plays a role of a delay component. While charging and based on the delay time determined by the resistor R and the parasitic capacitance C3, the gate voltage $V_{Q2-G}$ of the clamp switch Q2 reaches the turn-on threshold voltage (Vgs-th) only when the drain-source voltage $V_{Q2-DS}$ is reduced to approximation of the forward voltage (VF) of the body diode, such that drive and control for the clamp switch Q2 can meet the requirement of the zero voltage switching.

Figure 7:
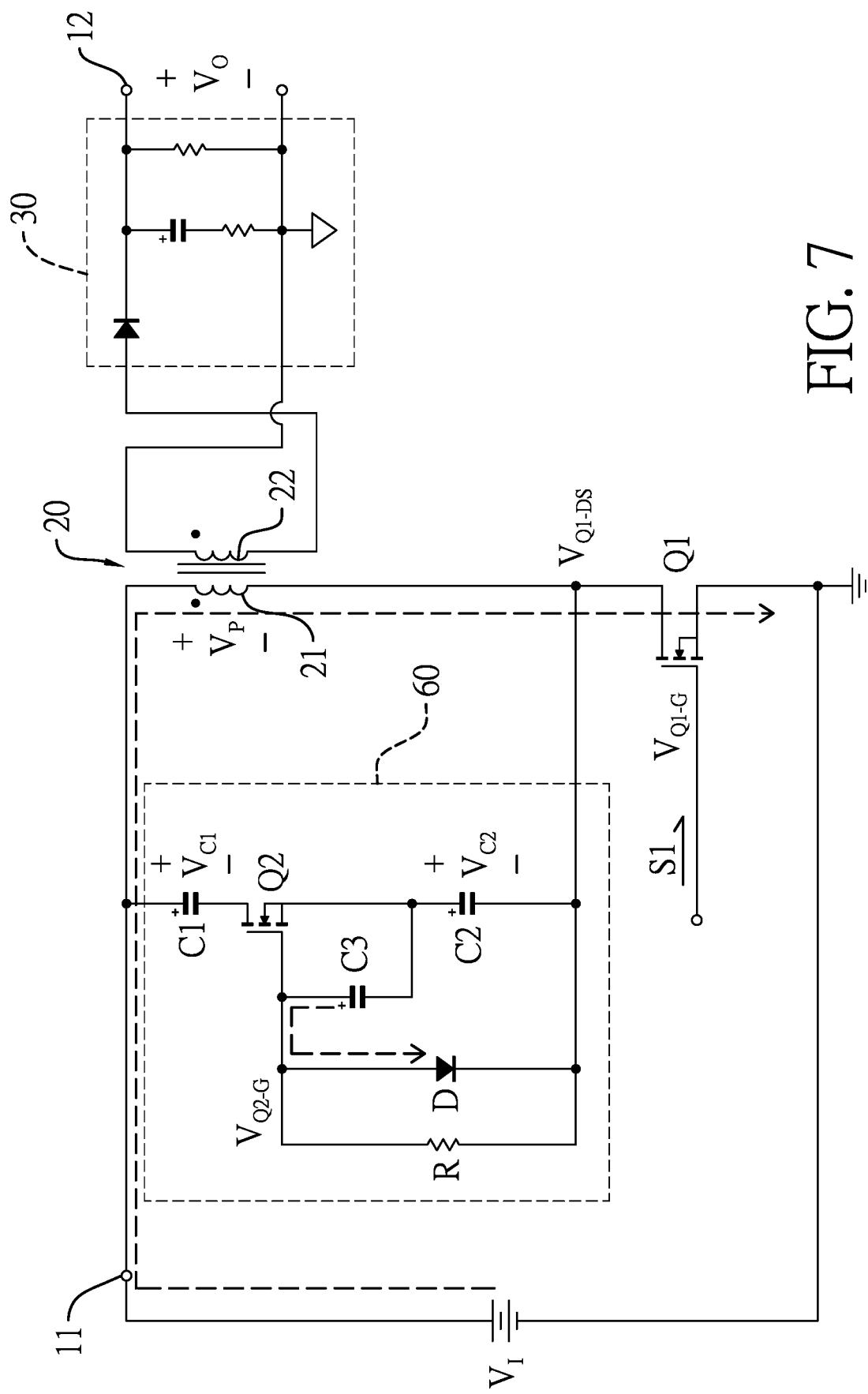
FIG. 7 is a circuit diagram of the operation that the switching switch (Q1) is turned on and the clamp switch (Q2) is turned off.

Time segment t3: Under the boundary current mode (BCM), the voltage $V_P$ of the primary-side winding 21 of the transformer 20 will be reduced to 0V gradually. The voltage $V_{C2}$ on the two terminals of the second capacitor C2 is reduced to 0V, too. As shown in FIG. 7, the parasitic capacitance C3 is discharged via the diode D, such that the voltage on the parasitic capacitance C3 is reduced to 0V rapidly. As a result, the gate voltage of the clamp switch Q2 will be lower than the turn-on threshold voltage (Vgs-th). Then, the clamp switch Q2 is turned off. Because the clamp switch Q2 can be turned off rapidly, the switching loss of the clamp switch Q2 will be decreased. The drain-source voltage $V_{Q1-DS}$ of the switch Q1 is gradually reduced to 0V from a prior high voltage level, and the operation within the time segment t0 will be repeated.

Time segment t4: The switching switch Q1 is turned on. As shown in FIG. 7, the operation within the time segment t1 will be repeated.

In a preferred embodiment, in order to minimize the on-state resistance ($R_{DS}$) and the loss of the clamp switch Q2 while turned on, an ideal driving voltage around 10V as an example should be retained on the gate of the clamp switch Q2. In general, the sum of voltage of the first capacitor C1 and the second capacitor C2, represented as $V_{C1}+V_{C2}$, is approximately equal to the voltage $V_P$ of the primary-side winding 21 while discharging, wherein $V_P$ is as the inverse voltage. At that time, the relationship regarding the voltage $V_P$, a winding number $N_P$ of the primary-side winding 21, and a winding number $N_S$ of the secondary-side winding 22 may be represented as $V_P=[(N_S/N_P) \times V_O]$. In the design practice for the converter, the voltage $V_P$ is limited by the winding ratio and fails to approximate the ideal driving voltage of 10V due to various demands for input/output. In the present invention, by selecting a proper capacitance value for the second capacitor C2, the ideal driving voltage approximating 10V will be obtained on the second capacitor C2 according to the voltage division by the first capacitor C1 and the second capacitor C2. The gate of the clamp switch Q2 will have a proper driving voltage. Then the present invention will achieve the ideal driving effect.

In conclusion, the present invention has advantages including:

1. The microcontroller 40 detects the input voltage $V_I$ and the feedback voltage $V_{FB}$ of the switching power converter 10 in real time. The feedback voltage $V_{FB}$ may reflect the loading. The microcontroller 40 performs the hybrid control of the multi modes including the variable-frequency mode, the constant-frequency mode, and the pulse-skipping mode, so to implement the power conversion feature including the optimization for the efficiency curve.

For example, when the load connected to the DC-DC converting circuit of the present invention is the full loading or the heavy loading, the microcontroller 40 performs the variable-frequency mode. As the loading becomes lighter, the frequency of the driving signal S1 outputted to the switching switch Q1 becomes higher accordingly. The switching switch Q1 switched under higher frequency for the light loading, the super light loading, and no loading will cause several problems, such as high frequency noise, switching loss, and electromagnetic interference to the wires on the circuit boards. In order to avoid the above-mentioned problems, the microcontroller 40 can instantly switch to the constant-frequency mode, and further, instantly switch to the pulse-skipping mode for the super light loading or no loading. Therefore, the frequency of the driving signal S1 will be retained at a constant frequency and will not rise. By doing so, the power conversion efficiency is optimized. The above-mentioned problems including the high frequency noise, the switching loss, and the electromagnetic interference are efficiently mitigated.

2. Based on the active clamp circuit 60 in the present invention, no more driving circuit should be additionally added. In the present invention, the active clamp circuit 60 can autonomously turn on and off the clamp switch Q2 according to the voltage polarity of the voltage $V_P$ of the primary-side winding 21 of the transformer 20. The active clamp circuit 60 not only absorbs the current spike by the first capacitor C1 and the second capacitor C2, but also provides the gate of the clamp switch Q2 with an ideal driving voltage by a proper selection for the capacitance of the second capacitor C2. The clamp switch Q2 while turned on may have lower on-state resistance ($R_{DS}$), such that the loss will be reduced.

What is claimed is:

1. A multi-mode hybrid control DC-DC converting circuit comprising:
   a switching power converter comprising:
      a transformer; and
      a switching switch connected to a primary-side winding of the transformer in series and having a control terminal; and
   a microcontroller connected to the switching power converter and the control terminal of the switching switch and storing multiple feedback reference values and multiple ratio values; wherein
      the microcontroller detects an input voltage of the switching power converter, selects one of the multiple feedback reference values according to a magnitude of the input voltage, multiplies the feedback reference value selected by the microcontroller by the multiple ratio values respectively to set multiple thresholds, and determines whether a feedback voltage of the switching power converter is higher or lower than each one of the thresholds to perform a variable-frequency mode, a constant-frequency mode, or a pulse-skipping mode;
      the microcontroller outputs a driving signal to the switching switch and correspondingly adjusts a frequency of the driving signal according to the variable-frequency mode, the constant-frequency mode, or the pulse-skipping mode which is performed.

2. The DC-DC converting circuit as claimed in claim 1, wherein the microcontroller is connected to a power output terminal of the switching power converter via an isolation feedback circuit to receive the feedback voltage from the isolation feedback circuit.

3. The DC-DC converting circuit as claimed in claim 2, wherein
   the thresholds include a first threshold and a second threshold lower than the first threshold;
   when the microcontroller determines that the feedback voltage is higher than the first threshold, the microcontroller performs the variable-frequency mode to change the frequency of the driving signal with loading;
   when the microcontroller determines that the feedback voltage is lower than or equal to the first threshold and higher than the second threshold, the microcontroller performs the constant-frequency mode to keep the frequency of the driving signal constant;
   when the microcontroller determines that the feedback voltage is lower than or equal to the second threshold, the microcontroller performs the pulse-skipping mode to determine whether the feedback voltage rises to be higher than or equal to the second threshold;
   the microcontroller performs the constant-frequency mode to keep the frequency of the driving signal constant when determining the feedback voltage is higher than or equal to the second threshold in the pulse-skipping mode;
   the microcontroller stops outputting the driving signal to the switching switch when determining the feedback voltage is not higher than or equal to the second threshold in the pulse-skipping mode.

4. The DC-DC converting circuit as claimed in claim 3, wherein
   in the variable-frequency mode, the frequency of the driving signal is defined as a full-load frequency while the loading is full;
   in the constant-frequency mode and the pulse-skipping mode, the frequency of the driving signal is equal to or higher than a half of the full-load frequency.

5. The DC-DC converting circuit as claimed in claim 4 further comprising an active clamp circuit connected to the primary-side winding of the transformer, wherein the active clamp circuit comprises:
   a clamp switch connected between a first capacitor and a second capacitor in series, wherein another terminal of the first capacitor is connected to a first terminal of a primary-side winding of the transformer, and another terminal of the second capacitor is connected to a second terminal of the primary-side winding of the transformer; and
   a resistor, wherein a terminal of the resistor is connected to a control terminal of the clamp switch, and another terminal of the resistor is connected to the second terminal of the primary-side winding of the transformer;
   wherein the switching switch of the switching power converter has a terminal connected to the second terminal of the primary-side winding of the transformer to form a series connection with the transformer.

6. The DC-DC converting circuit as claimed in claim 5, wherein the active clamp circuit comprises a diode having:
   an anode connected to the control terminal of the clamp switch; and
   a cathode connected to the second terminal of the primary-side winding of the transformer.

7. The DC-DC converting circuit as claimed in claim 3 further comprising an active clamp circuit connected to the primary-side winding of the transformer, wherein the active clamp circuit comprises:
   a clamp switch connected between a first capacitor and a second capacitor in series, wherein another terminal of the first capacitor is connected to a first terminal of the primary-side winding of the transformer, and another terminal of the second capacitor is connected to a second terminal of the primary-side winding of the transformer; and
   a resistor, wherein a terminal of the resistor is connected to a control terminal of the clamp switch, and another terminal of the resistor is connected to the second terminal of the primary-side winding of the transformer;
   wherein the switching switch of the switching power converter has a terminal connected to the second terminal of the primary-side winding of the transformer to form a series connection with the transformer.

8. The DC-DC converting circuit as claimed in claim 7, wherein
   the active clamp circuit comprises a diode;
   an anode of the diode is connected to the control terminal of the clamp switch;
   a cathode of the diode is connected to the second terminal of the primary-side winding of the transformer.

9. The DC-DC converting circuit as claimed in claim 2 further comprising an active clamp circuit connected to the primary-side winding of the transformer, wherein the active clamp circuit comprises:
   a clamp switch connected between a first capacitor and a second capacitor in series, wherein another terminal of the first capacitor is connected to a first terminal of the primary-side winding of the transformer, and another terminal of the second capacitor is connected to a second terminal of the primary-side winding of the transformer; and a resistor, wherein a terminal of the resistor is connected to a control terminal of the clamp switch, and another terminal of the resistor is connected to the second terminal of the primary-side winding of the transformer;

wherein the switching switch of the switching power converter has a terminal connected to the second terminal of the primary-side winding of the transformer to form a series connection with the transformer.

10. The DC-DC converting circuit as claimed in claim 9, wherein the active clamp circuit comprises a diode;

an anode of the diode is connected to the control terminal of the clamp switch;

a cathode of the diode is connected to the second terminal of the primary-side winding of the transformer.

11. The DC-DC converting circuit as claimed in claim 1 further comprising an active clamp circuit connected to the primary-side winding of the transformer, wherein the active clamp circuit comprises:

a clamp switch connected between a first capacitor and a second capacitor in series, wherein another terminal of the first capacitor is connected to a first terminal of the primary-side winding of the transformer, and another terminal of the second capacitor is connected to a second terminal of the primary-side winding of the transformer; and a resistor, wherein a terminal of the resistor is connected to a control terminal of the clamp switch, and another terminal of the resistor is connected to the second terminal of the primary-side winding of the transformer;

wherein the switching switch of the switching power converter has a terminal connected to the second terminal of the primary-side winding of the transformer to form a series connection with the transformer.

12. The DC-DC converting circuit as claimed in claim 11, wherein the active clamp circuit comprises a diode;

an anode of the diode is connected to the control terminal of the clamp switch;

a cathode of the diode is connected to the second terminal of the primary-side winding of the transformer.

13. A control method of a multi-mode hybrid control DC-DC converting circuit, performed by a microcontroller connected to a switching power converter and a switching switch and storing multiple feedback reference values and multiple ratio values, and comprising:

step (a) detecting an input voltage and a feedback voltage of the switching power converter;

step (b) selecting one of the multiple feedback reference values according to a magnitude of the input voltage and then multiplying the feedback reference value selected by the microcontroller by the multiple ratio values respectively to set multiple thresholds;

step (c) determining whether the feedback voltage of the switching power converter is higher or lower than each one of the thresholds; and step (d) performing a variable-frequency mode, a constant-frequency mode, or a pulse-skipping mode according to a determination result of the step (c), wherein the microcontroller outputs a driving signal to the switching switch and correspondingly adjusts a frequency of the driving signal according to the variable-frequency mode, the constant-frequency mode, or the pulse-skipping mode which is performed.

14. The control method as claimed in claim 13, wherein in the step (b), the thresholds include a first threshold and a second threshold lower than the first threshold;

the step (c) comprises:

step (c-1): the microcontroller determines whether the feedback voltage is lower than or equal to the first threshold; if NO, entering the step (d) to perform the variable-frequency mode to change the frequency of the driving signal with loading;

step (c-2): the microcontroller determines whether the feedback voltage is lower than or equal to the second threshold if YES in the step (c-1); if No in the step (c-2), entering the step (d) to perform the constant-frequency mode to keep the frequency of the driving signal constant;

step (c-3): the microcontroller enters the step (d) to perform the pulse-skipping mode if YES in the step (c-2) to determine whether the feedback voltage rises to be higher than or equal to the second threshold;

the microcontroller keeps the frequency of the driving signal constant and then returns to the step (c-1) if YES in the step (c-3);

the microcontroller stops outputting the driving signal to the switching switch if NO in the step (c-3).

15. The control method as claimed in claim 14, wherein the multiple ratio values include a first ratio value and a second ratio value;

in the step (b), the microcontroller multiplies the feedback reference value selected by the microcontroller by the first ratio value to obtain the first threshold, and multiplies the feedback reference value selected by the microcontroller by the second ratio value to obtain the second threshold;

the feedback reference value selected by the microcontroller corresponds to the input voltage of the switching power converter detected by the microcontroller.

16. The control method as claimed in claim 15, wherein in the variable-frequency mode, the frequency of the driving signal is defined as a full-load frequency while the loading is full;

in the constant-frequency mode and the pulse-skipping mode, the frequency of the driving signal is equal to or higher than a half of the full-load frequency.

17. The control method as claimed in claim 14, wherein in the variable-frequency mode, the frequency of the driving signal is defined as a full-load frequency while the loading is full;

in the constant-frequency mode and the pulse-skipping mode, the frequency of the driving signal is equal to or higher than a half of the full-load frequency.

* * * * *